Oct. 4, 1932.    W. BERG    1,880,681
MULTIPLE SPINDLE AUTOMATIC LATHE
Filed Sept. 4, 1929
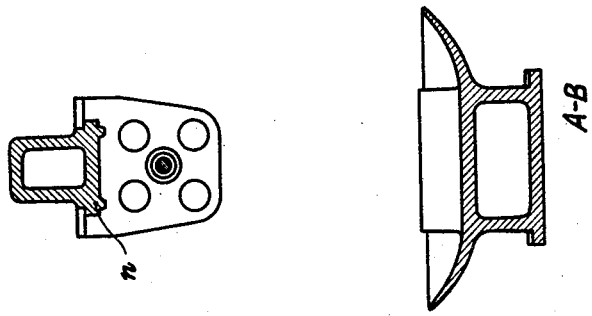
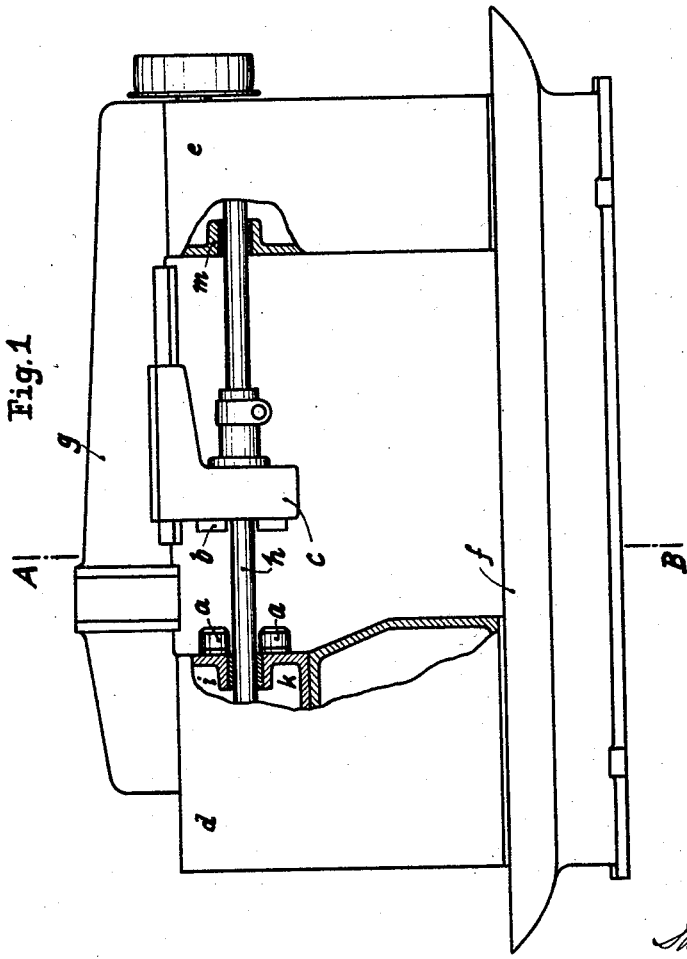

Patented Oct. 4, 1932

1,880,681

UNITED STATES PATENT OFFICE

WILHELM BERG, OF BIELEFELD, GERMANY

MULTIPLE-SPINDLE AUTOMATIC LATHE

Application filed September 4, 1929, Serial No. 390,289, and in Germany December 14, 1928.

The increased capacity of spindle automatic lathes, the increased rate of cut, and the employment of high-grade steel have now led to the production of a substantially larger quantity of turnings than was anticipated when such lathes were first designed, and particularly so far as the design of the bed is concerned. In the existing types of frames for automatic lathes, therefore, insufficient attention is bestowed on the removal of large quantities of turnings. Underneath the tool spindles and the tool carriers, the lathe is still cumbered with conveying and control members and other structural parts, so that the turnings have no free outlet and become lodged. As the result, in the case of automatic lathes running with a high cutting speed, there must always be someone to remove the lodged turnings with a hook, in order to prevent disturbing the work, or breakage of the machine, a state of things which is unendurable in the long run and necessarily leads to serious economic losses.

The present invention obviates these drawbacks by leaving the space underneath the work and the tool head free for the accommodation of the turnings. This is achieved by designing the bed of the machine as a frame consisting of a baseplate on the ends of which are erected two standards. The one standard carries the feed members for the tool carriers, and the other standard carries the work spindles carrying the work. The fourth side of the frame is formed by a beam of known type which lies parallel with the baseplate and connects the two standards together at the top.

Small multiple-spindle automatic lathes are known in which the tool carrier is mounted in a carrier arm. Although, in this case, the turnings produced can fall down freely, the design of these machine tools does not fit them for large outputs and therefore for producing large quantities of turnings.

A typical embodiment of the invention is illustrated in the accompanying drawing, in which Figure 1 is a side elevation, partly in section, of a multiple-spindle automatic lathe, and Figure 2 is a section taken on the line A—B of Figure 1.

The two box-shaped standards $d$ and $e$ are set up on the baseplate $f$, which is designed as a trough. The standard $d$ accommodates the spindle drum $k$, which carries the tool spindles $a$. The standard $e$ serves to accommodate the feed members for the tool-carrier head $c$ which is also guided by the prismatic guides $n$, through the round guide $h$, which is mounted at $m$ and $i$. The tool carriers $b$ are mounted in the sliding tool-carrier head $c$.

What I claim is:

1. A multiple-spindle automatic lathe having a base plate, two uprights of box-like pattern mounted on said base plate and a top beam connecting the said two uprights together, a tool holder located between said uprights, said uprights adapted to have mounted thereon the members for the rotational movement of the work and for the forward movement of the tool holder.

2. A multiple-spindle automatic lathe having a base plate, two uprights of box-like pattern mounted on said base plate and a top beam connecting the said two uprights together, said uprights adapted to have mounted thereon the members for the rotational movement of the work and for the forward movement of the tool holder, and said top beam having provided thereon guides along which travels a tool holder.

3. An automatic multiple-spindle machine having a frame comprising a bed provided with a pair of spaced upright columns unconnected at their sides and beam connected at their tops and within which space a reciprocating tool carrier is located in position to leave a clear opening below the tool carrier and from column to column.

4. An automatic multiple-spindle machine having a frame comprising a trough-shaped bed provided with a pair of spaced upright columns unconnected at their sides and beam connected at their tops and within which space a reciprocating tool carrier is located in position to leave a clear opening below the tool carrier and from column to column.

5. An automatic multiple-spindle machine having a frame comprising a bed provided with a pair of spaced upright columns unconnected at their sides and beam connected at their tops and within which space a reciprocating tool carrier is located in position to leave a clear opening below the tool carrier and from column to column, a sliding tool carrier mounted between said columns, work spindles carried by one of said columns, and means carried by the other column for reciprocating said sliding tool carrier.

6. An automatic multiple-spindle machine having a frame comprising a trough-shaped bed provided with a pair of spaced upright columns unconnected at their sides and beam connected at their tops and within which space a reciprocating tool carrier is located in position to leave a clear opening below the tool carrier and from column to column, a sliding tool carrier mounted between said columns, work spindles carried by one of said columns, and means carried by the other column for reciprocating said sliding tool carrier.

7. An automatic multiple-spindle machine having a frame comprising a bed provided with a pair of spaced upright columns unconnected at their sides and beam connected at their tops and within which space a reciprocating tool carrier is located in position to leave a clear opening below the tool carrier and from column to column, a sliding tool carrier mounted between said columns, work spindles carried by one of said columns, means carried by the other column for reciprocating said sliding tool carrier, and means carried by the beam connection for guiding said sliding tool carrier.

8. An automatic multiple-spindle machine having a frame comprising a trough-shaped bed provided with a pair of spaced upright columns unconnected at their sides and beam connected at their tops and within which space a reciprocating tool carrier is located in position to leave a clear opening below the tool carrier and from column to column, a sliding tool carrier mounted between said columns, work spindles carried by one of said columns, means carried by the other column for reciprocating said sliding tool carrier, and means carried by said beam connection for guiding said tool carrier.

9. An automatic multiple-spindle machine having a frame comprising a supporting bed provided adjacent to its opposite ends with a pair of spaced upright columns unconnected at their sides and beam connected at their tops, a sliding tool carrier above and free of the bed, a guide carried by said columns for supporting said sliding tool carrier, means carried by one of said columns for reciprocating said tool carrier, and work spindles carried by the other column.

10. An automatic multiple-spindle machine having a frame comprising a supporting bed provided adjacent to its opposite sides with a pair of spaced upright columns unconnected at their sides and beam connected at their tops, a sliding tool carrier above and free of the bed, a guide carried by said columns and located nearer the tops than the bottoms of said columns for supporting said sliding tool carrier, means carried by one of said columns for reciprocating said tool carrier, and work spindles carried by the other column nearer the top than the bottom thereof.

11. In an automatic multiple-spindle machine, the combination of a bed, a plurality of rotary work spindles, a sliding tool carrier supported above and free of the bed to provide an opening thereunder through the center of the machine, a pair of spaced upright columns carried adjacent to the ends of said bed, means extending from one column to the other and passing through the sliding tool carrier, thereby to permit the reciprocation thereof, and a beam connecting the upper ends of said columns, said tool carrier and columns being so located that the major opening between the columns from side to side thereof is below the sliding tool carrier.

12. A metal working machine having a frame comprising a bed provided with a pair of spaced upright columns, beam connected at their tops and unconnected by any framework or frame connection between the two columns other than at the base of the columns by the bed and at the tops thereof by the beam, a sliding tool carrier mounted between said columns, work spindles carried by one of said columns, and means carried by the other column for reciprocating said sliding tool carrier.

In testimony whereof he affixes his signature.

WILHELM BERG.